United States Patent [19]
Eng et al.

[11] Patent Number: 5,757,783
[45] Date of Patent: May 26, 1998

[54] METHOD AND APPARATUS FOR ROUTING ATM CELLS IN AN AD-ATM LAN

[75] Inventors: Kai Yin Eng, Atlantic Highlands; Mark John Karol, Fair Haven; Malathi Veeraraghavan, Atlantic Highlands, all of N.J.

[73] Assignee: Lucent Technologies Inc., Murray Hill, N.J.

[21] Appl. No.: 490,981

[22] Filed: Jun. 15, 1995

[51] Int. Cl.⁶ .................................................. H04L 12/56
[52] U.S. Cl. .................. 370/315; 370/349; 370/394; 370/397; 370/409; 370/410; 455/11.1
[58] Field of Search .............. 370/54, 58.1, 158.2, 370/58.3, 60, 60.1, 94.1, 94.2, 95.1, 95.3, 110.1, 351, 389, 895, 396, 397, 400, 408, 409, 410, 310, 328, 338, 315, 327, 349; 340/825.02, 825.03; 375/211; 379/58, 59, 60, 61, 63, 220, 221; 455/31.1, 33.2, 422, 436, 437, 440, 11.1

[56] References Cited

U.S. PATENT DOCUMENTS

| | | | |
|---|---|---|---|
| 5,357,508 | 10/1994 | Le Boudec et al. | 370/397 |
| 5,359,603 | 10/1994 | McTiffin | 370/95.1 |
| 5,440,547 | 8/1995 | Easki et al. | 370/60.1 |
| 5,442,633 | 8/1995 | Perkins et al. | 370/94.1 |
| 5,487,065 | 1/1996 | Acampora et al. | 370/95.1 |
| 5,488,608 | 1/1996 | Flammer et al. | 370/400 |

OTHER PUBLICATIONS

Broadband Integrated Networks, Mischa Schwartz, 1996.
ATM networks, Concepts, Protocols, Applications, Huber et al., 1994.

Broadband Integrated Networks, Mischa Schwartz, 1996.
ATM networks, Concepts, Protocols, Applications, Huber et al., 1994.

*Primary Examiner*—Benedict V. Safourek
*Assistant Examiner*—Seema S. Rao

[57] ABSTRACT

A system and method for routing ATM cells in a wireless ATM local area network (LAN) that use portable base station (PBS) switching nodes. Routing of cells to and from mobile users within the network is accomplished utilizing a novel routing scheme which preserves cell sequence. Each user transmitting data to another user is associated with a Source Home Station or node and each user receiving data is associated with a Destination Home Station or node. When a connection is established in the network between a first mobile user and a second mobile user, the ATM cells are routed along a fixed path from the first mobile user to the associated Source Home Station and along a fixed path between the Source Home Station to the Destination Home Station and then along a fixed path from the Destination Home Station to the second destination user. In this way cell sequence is maintain by utilizing the Source Home to Destination Home path. Mobile users within the network are also associated with a Local PBS which can be different from the Home Stations as the mobile moves around the network. The Local PBSs associated with the mobile user are slowly updated to be the Home Stations to cure inefficient routing.

23 Claims, 9 Drawing Sheets

METHOD AND APPARATUS FOR ROUTING ATM CELLS IN AN AD-ATM LAN

RELATED APPLICATIONS

The present patent application is related to U.S. patent application Ser. Nos. 08/490,980 and 08/490,979, entitled SIGNALING AND CONTROL ARCHITECTURE FOR AN AD-HOC ATM LAN and PORTABLE BASE STATION ARCHITECTURE FOR AN AD-HOC ATM LAN, now U.S. Pat. No. 5,623,495, respectively, filed concurrently herewith, those applications having at least one common inventor and common assignee and being incorporated herein by reference.

FIELD OF THE INVENTION

The present invention relates to packet-based telecommunications networks, and more particularly to the routing of ATM cells in such a network.

BACKGROUND OF THE INVENTION

ATM (Asynchronous Transfer Mode) technology is maturing rapidly for telecommunications as well as computer networking applications. The prospect of an "all ATM" scenario from wide-area network (WAN) to local-area network (LAN) is becoming increasingly promising. Discussions on "ATM to the desktop" have begun to appear in various technical circles, particularly those interested in multimedia applications. Wireless communications, on the other hand, has gained global acceptance and popularity in the cellular voice market. Emerging wireless services such as PCS (Personal Communications Service) are threatening to replace traditional wired telephone and low-rate data access systems. Wireless LAN products (e.g., WaveLan in the Mb/s range) have already found their way in the commercial marketplace. Extending ATM from the LAN/WAN infrastructure towards the wireless user is a task faced by researchers today.

The ATM protocol is intended for transmission on a reliable physical layer such as optical fibers. Wireless links, on the other hand, are notorious for their unreliability and poor bit error rates. Thus, overcoming this incompatibility at the onset is a major research challenge.

Another important aspect of wireless networking is the user mobility. The whole concept of ATM VP/VC (virtual path/virtual circuit) has been centered on fixed point end users. Although other research efforts have discussed the use of ATM in wireless networks, they have been limited to centralized architectures 10 with wireless access links as shown in FIG. 1. The centerpiece in FIG. 1 is the ATM switch 12 providing centralized cell routing and mobility management in the entire system. Even though some distributed functions may be assigned to the access points 14, the system intelligence for mobility management resides at the ATM switch 12. The access points are "hardwired" to the central switch while the wireless links serve as extension cords to the users.

It is recognized that wired networks are here to stay, and ATM has the potential to become ubiquitous. In such a case, there will be standard ATM interfaces on workstations, computer servers, and other peripherals attached to a LAN. Therefore, it is advantageous for a wireless LAN to support ATM cell transport directly into the terminals so as to minimize protocol conversion. As exemplified in FIG. 2, the wireless LAN 16 carries "Wireless ATM" (WATM) whereas the WAN 18 carries (standard) ATM, with a WATM/ATM converter 19 (or gateway) in between. An ideal goal for seamless networking would strive for the elimination of the WATM/ATM converter 19. This is unrealistic because wireless link layer protocols need to be designed differently in order to cope with the poor transmission channel characteristics. Furthermore, this idealistic goal is unnecessary because WATM can be designed essentially the same as ATM except for some header byte redefinition and thus keeping the WATM/ATM gateway very simple. It is in this spirit that we approach the subject of Wireless ATM, namely preserving the overall ATM data structure and minimizing changes in the header. Encapsulated ATM and other similar techniques are deemed consistent with this philosophy and are part of the consideration.

SUMMARY OF THE INVENTION

The present invention is a system and method for routing ATM cells in a wireless ATM local area network (LAN) that use portable base station (PBS) switching nodes. Routing of cells to and from mobile users within the network is accomplished utilizing a novel routing scheme which preserves cell sequence. Each user transmitting data to another user has a Source Home Station or node for each of its connections and each user receiving data is associated with a Destination Home Station or node for each of its connections. When a connection is established in the network between a first mobile user and a second mobile user, the ATM cells are routed along a fixed path from the first mobile user to the associated Source Home Station and along a fixed path between the Source Home Station to the Destination Home Station and then along a fixed path from the Destination Home Station to the second destination user. In this way cell sequence is maintain by utilizing the Source Home to Destination Home path.

Mobile users within the network are also associated with a Local PBS which can be different from the Home Stations as the mobile moves around the network. The Local PBSs associated with the mobile user are slowly updated to be the Home Stations to cure inefficient routing.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION

Figure 3:
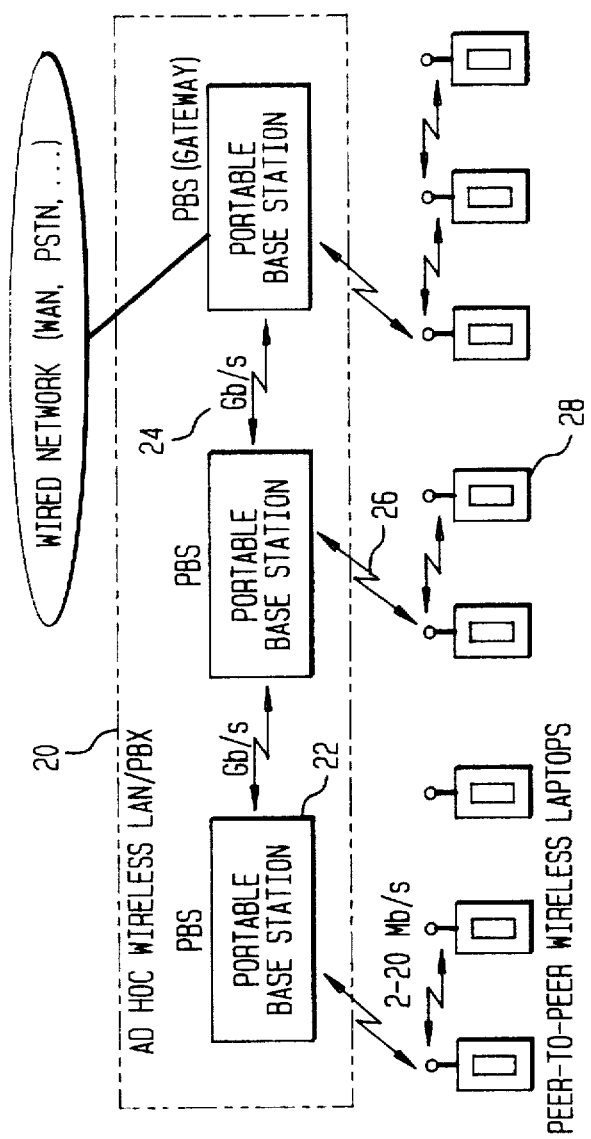
FIG. 3 shows a representation of an Ad-Hoc Wireless LAN according to the present invention.

The present invention is described in terms of a LAN consisting of a network of nodes called Portable Bases Stations (PBSs) which provide microcell coverage. Referring to FIG. 3, there is shown exemplary representation of the LAN 20 which includes a plurality of interconnected PBSs 22. Although the interconnection between the PBSs can be either wired or wireless, the emphasis here is on wireless implementations, for example, radio or free-space optics.

Portable Base Station Architecture

An advantage of the Portable Base Station architecture is that the PBSs can employ an ad-hoc networking layout. That is, the PBSs can be distributed in an arbitrary topology to form a backbone network that can be reconfigured with relative ease. In FIG. 3 the PBS to PBS backbone links 24 are high speed, for example GB/s, for supporting high system capacity.

The user to PBS access links 26, on the other hand are primarily for mobile access (e.g., 2-20 Mb/s) and therefore are wireless. The mobiles 28 which may be comprised of laptops, notebooks, etc. utilize multiple access protocols that permit mobiles to share the user to PBS links, as will be discussed. Here it is also pointed out that mobiles 28 can communicate with one another directly as peer-to peer if they are near each other. Otherwise, they communicate by using the PBS backbone LAN.

As discussed, typical mobile endpoints are assumed to be laptops or notebook computers. Services supported include conventional data applications (e.g., over TCP/IP or SPX over ATM) as well as multimedia (video, voice and data) applications directly over an ATM Adaptation Layer (AAL) and ATM with a Quality of Service (QoS) specification. For TCP/IP networks, there exist approaches to mobility management at the network layer, e.g., Mobile IP. In the present invention network, the approach is similar, except mobility management and handoffs are handled at the ATM layer. Thus, the ATM layer becomes the networking layer and mobility management is extended to applications that are directly carried by AAL and ATM.

Figure 4:
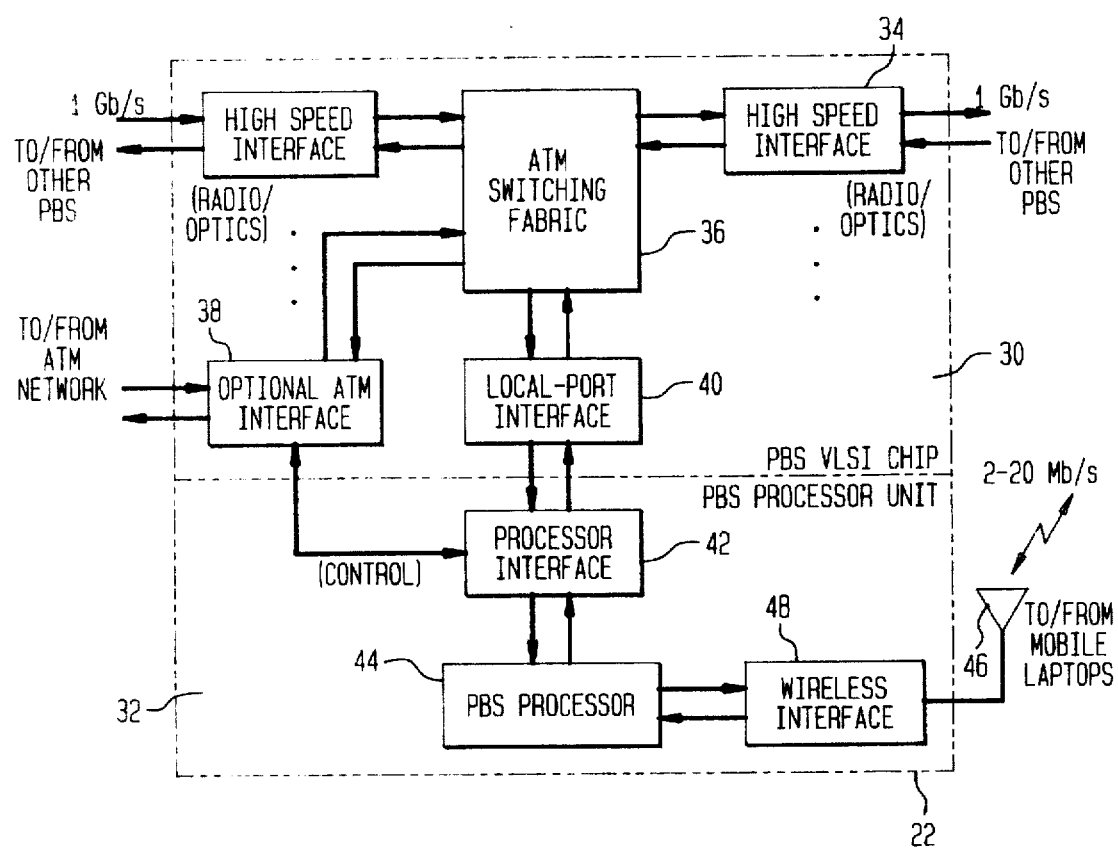
FIG. 4 shows one preferred embodiment of a PBS architecture according to the present invention.

Referring to FIG. 4, there is shown one preferred embodiment for a PBS architecture 22 according to the present invention. As shown, the PBS 22 is comprised of two main components, for example, a PBS VLSI chip 30 which contains all switching and interface functions and a PBS processor unit 32. The switching and interface functions of the PBS chip are included in a single chip so as to minimize power and space. The PBS processor unit 32 is basically a controller that can be implemented with single-chip designs as well.

As can be seen, the PBS chip 30 includes a plurality of high speed interfaces 34 for communicating with other PBSs. The high speed interfaces 34 transmit, for example, in the Gb/s range and as mentioned previously, may be hardwired, but are preferably coupled wirelessly using radio and/or optics. The high speed interfaces 34 are coupled to ATM switching fabric 36 which is responsible for the physical routing within the chip 30. Also coupled to the switching fabric is an optional ATM 38 interface which has connections to and from an ATM network. The ATM switching fabric 36 is coupled to the PBS processor unit 32 by means of a local port interface 40. The local port interface 40 is in turn coupled to a processor interface 42 which couples to the PBS processor 44. Signals to and from the mobile laptops are transmitted and received at an antenna 46 or other receive/transmit means where the signals travel at the Mb/s range. A wireless interface 48 couples the antenna 46 to the PBS processor 44. The processor interface 42 may also have a direct connection to the optional ATM interface 38 for control purposes.

Thus, the PBS network is made up of small, high speed ATM switches. It is an intention to employ off-the-shelf switch fabrics 36, with the addition of custom hardware and/or software in the PBS backbone network. This requires adhering to ATM standards as much as possible in the PBS backbone network.

Figure 5:
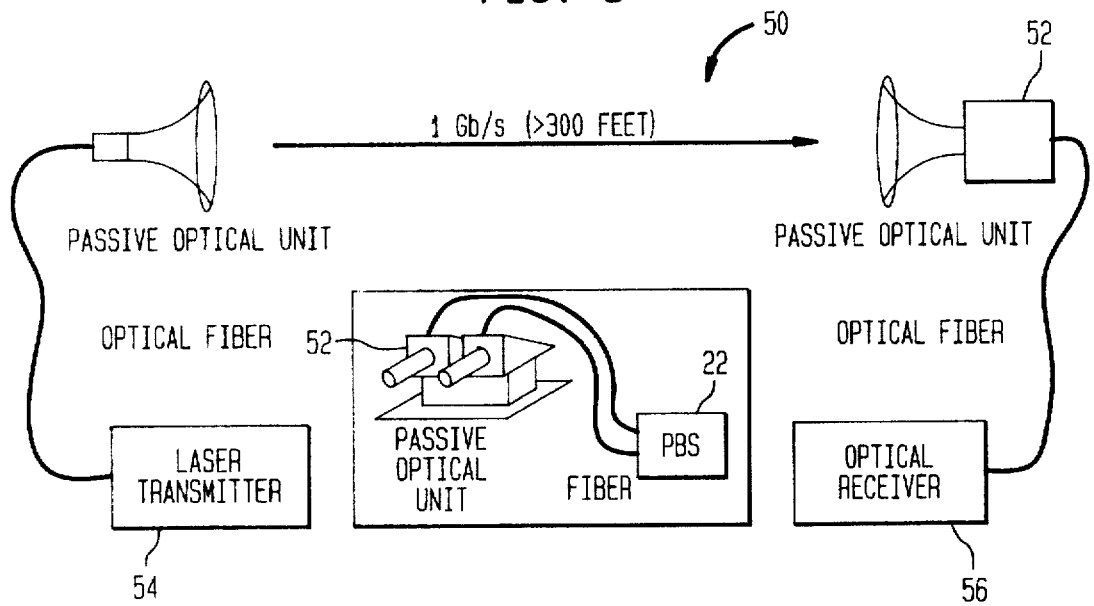
FIG. 5 shows a one preferred embodiment of a free space optical link used with the present invention LAN.

Referring to FIG. 5, there is shown one preferred embodiment of a free space optical link 50 used with the present invention LAN. The system employs 1 Gb/s free-space optical links for PBS to PBS communications and a 2 Mb/s radio operating at 900 MHz for user to PBS communications. A passive optical lens assembly 52 is used to launch and receive the optical beam so that the active components can be integrated into the PBS 22 itself. The passive optical unit 52 may be used in conjunction with a laser transmitter 54 and optical receiver 56.

An important aspect of the wireless networking scheme utilizing PBSs is that of user mobility. In addressing this issue, the following assumptions are made with regard to boundary conditions: (i) slow mobility, for example, walking speed, (ii) distributed control, and (iii) permitted movement through blind spots. A goal of the present invention PBS networking scheme is to keep the PBSs simple and low cost. To that end the traditional ATM VP/VC (virtual path/ virtual channel) has been modified so as to eliminate the need for any VP/VC translation in the high speed (Gb/s) portion of intermediate PBS switches. As a consequence, a "VPI" (virtual path identifier) in the present wireless LAN scheme corresponds to a particular destination PBS, rather than to a virtual path of base stations and links., where multiple VPIs can be assigned to each PBS.

Figure 6:
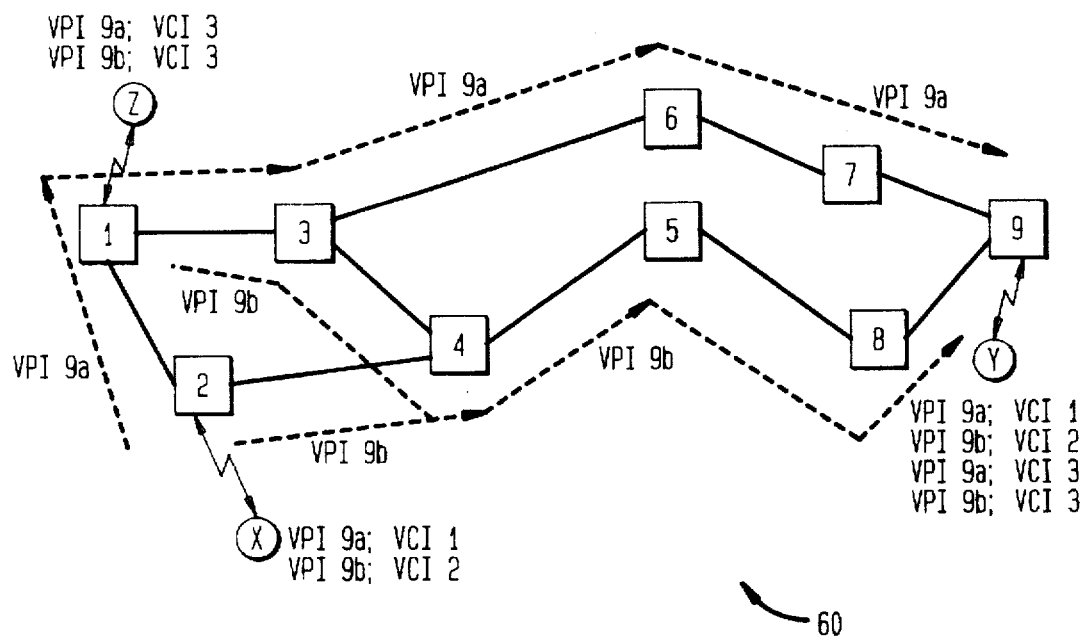
FIG. 6 shows an exemplary LAN configuration which illustrates the present invention Wireless ATM VP/VC concepts.

Referring to FIG. 6, there is shown an exemplary LAN 60 comprised of PBSs labeled 1-9 and used to illustrate the wireless ATM VP/VC concepts of the present invention. Mobiles labeled X, Y and Z are shown associated with PBSs 2, 9 and 1, respectively. The concept of multiple VPI assignments to single PBSs is illustrated in FIG. 6, where VPI 9a and 9b are each assigned to PBS 9. In other words, all cells with VPI 9a and VPI 9b are routed to the destination PBS 9. Associated with each VPI (Destination ID) is a unique route through the network from each source, thus forming a tree with the destination as the root. To distinguish cells from different connections, each PBS controls the assignment of VCIs associated with VPIs that terminate at that PBS. For example, in FIG. 6, (VPI 9a; VCI 1) and (VPI 9b; VCI 2) denote X to Y mobile connections, and (VPI 9a; VCI 3) and (VPI 9b; VCI 3) denote Z to Y connections. The VCI is established by making an inquiry to the destination PBS using a signaling channel during ATM connection establishment.

In order to support mobility within the network, sequence numbers for ATM cells will be utilized in certain parts of the network. Note that sequence numbers are available in the payload of an ATM cell for AAL (ATM Adaptation Layer) I through 3/4, but not for AAL 5. This means that part of the header field must be utilized for carrying sequence numbers. As the Generic Flow Control (GFC) field is not needed in the PBS backbone network, the GFC field is chosen to be used for carrying sequence numbers. This leaves a total of 3 bytes to carry the Destination ID and the VCI. These 3 bytes can be divided in any way to carry the destination ID and the VCI. At the expense of restricting the number of PBSs in a backbone network to 256, the Destination ID can be set to 1 byte. This has the advantage of adhering to the ATM UNI standard. However, as would be understood by one skilled in the art, better use of the 3 bytes may be possible with a "non-standard" division between Destination ID and VCI.

With the Destination ID set to 1 byte and VCI set to 2 bytes, an ATM network is created for the PBS backbone network where the Destination ID corresponds to the VPI. As far as the "microstructure" of the PBS operation is concerned, the operation in the PBS backbone network and an ATM network is the same, i.e., an output port is determined based on the input port and Destination ID, wherein in the above case, no change is made in the VPI/VCI field. If the Destination ID field is larger than 1 byte, although operation is still the same, off-the-shelf ATM switch fabrics may not be used without changes to their VPI/VCI operation.

Another advantage of setting the Destination ID field to 1 byte is that a mobile can communicate with a node outside of the wireless LAN through a gateway PBS without the gateway needing to change anything in the VPI/VCI field of an ATM cell. The ATM signaling protocols allow a node connected to an ATM network to set the VPI/VCI fields for connections to and from the ATM network. With this simplification, functionality of a gateway PBS is highly reduced and potentially any PBS can be a gateway.

Figure 1:
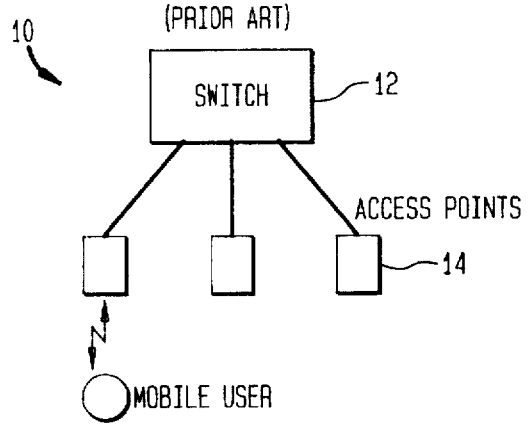
FIG. 1 shows a representation of a conventional wireless network architecture.
Figure 2:
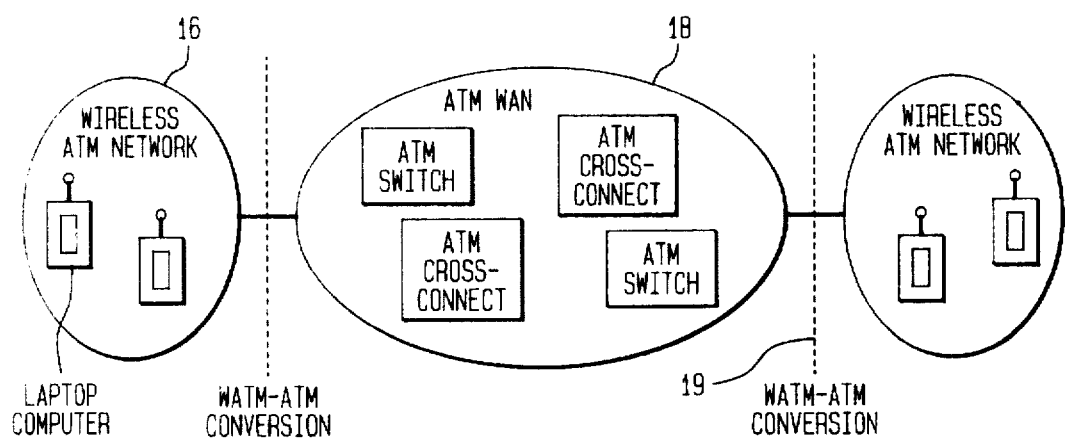
FIG. 2 shows a representation of an interworking between an ATM Wide Area Network (WAN) and a Wireless ATM Network (WATM)
Figure 7:
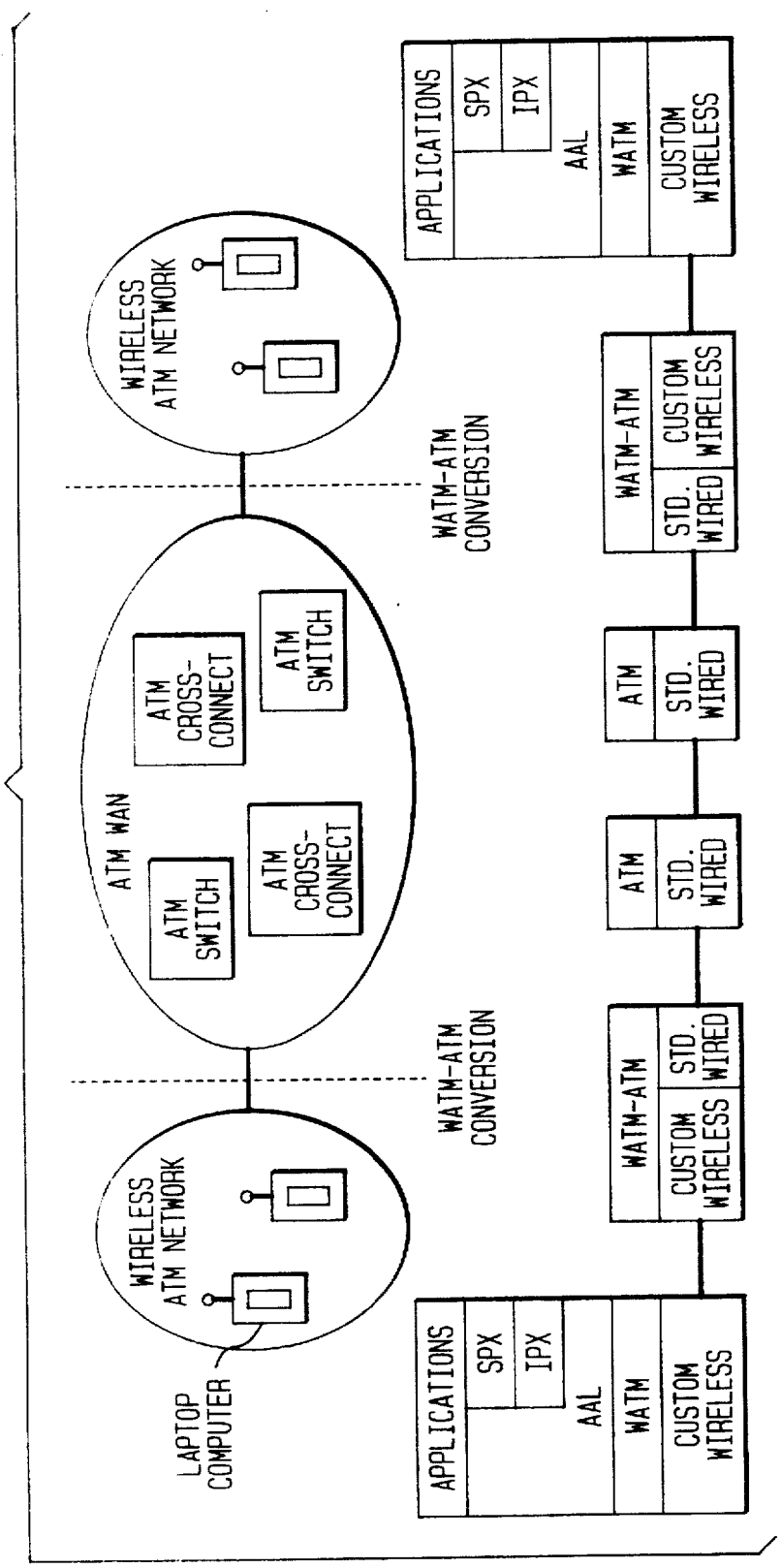
FIG. 7 shows a target protocol stack for the network signal flow illustrated in FIG. 2.

Referring to FIG. 7, a target protocol stack for the network is shown below the signal flow illustration discussed in FIG. 2. As can be seen, the target protocol stack is as follows, Wireless Mobile: Custom Wireless, WATM, AAL, IPX, SPX, Application; PBS-Mobile: Custom Wireless, WATM-ATM; PBS-PBS: High Speed Physical Layer, ATM; Wired User: High Speed Physical Layer, ATM, AAL, IPX, SPX, Application. In the protocol stack, "Custom Wireless" has a custom physical layer and a custom multiple access control. The custom physical layer has encapsulation of one or more ATM cells. This encapsulation has a FEC/CRC (forward error correction/cyclic redundancy checking), and may have additional cells for cell-level FEC.

Homing Algorithm Routing Scheme

In a mobile environment, handoffs between base stations is straightforward when the traffic is circuit switched with matched source/sink data rates. In contrast, when the traffic is packet-switched with source data rates much greater than sink data rates (e.g. many more sources simultaneously transmitting packets to a common destination), there are many more challenges. For example, if ATM cells were always routed to a mobile's current position, then many cells for a given mobile may end up queued at other base stations (where the mobile previously was positioned). It would then be necessary to retrieve those cells from those multiple distributed queues and deliver them to a mobile in a proper FIFO sequence.

Figure 8:
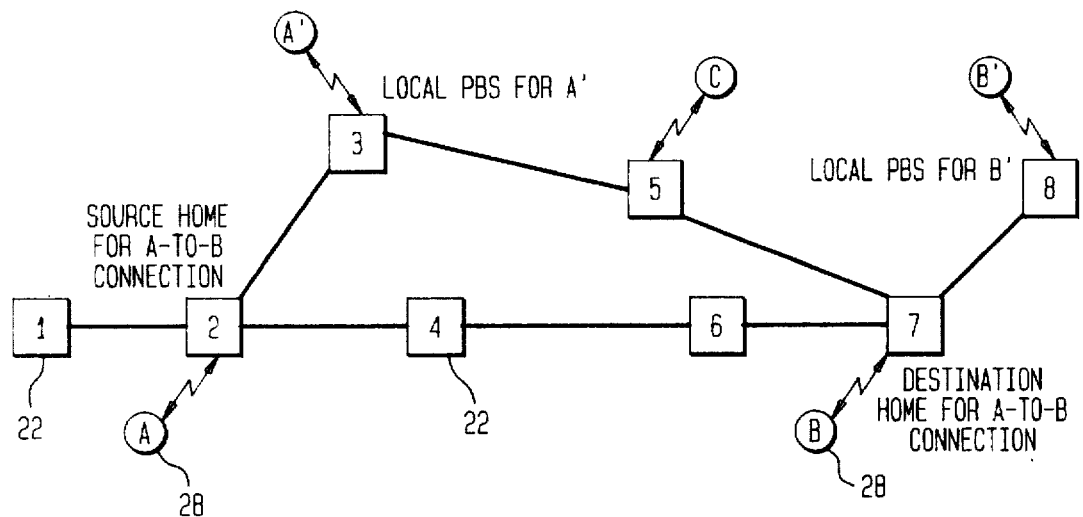
FIG. 8 shows an exemplary LAN configuration for illustration of the present invention Homing Algorithm routing scheme.

The present invention uses a routing scheme or Homing Algorithm for routing ATM cells in the wireless mobile network which preserves the proper FIFO sequence, and which allows users to move about the network and continue communications perhaps even during the middle of an active session or conversation. Referring to FIG. 8, there is shown an exemplary network configuration in which boxes labeled 1–8 represent PBSs 22 (ATM packet switches), and circles A and B denote (two) mobile users 28 that are communicating with each other. A' and B' denote the locations of A and B at a later time. A and B have wireless connections to the network (specifically at PBSs 2 and 7, respectively) and the high speed links between PBSs can be either wired or wireless. The term "Local PBS" is used when referring to a PBS associated with a mobile's current position.

In order to maintain reliable, in-sequence ATM transmissions as users move during the course of a connection, a "Source Home Station" and "Destination Home Station" are utilized. These Stations refer to particular PBSs, associated with a connection, that play a pivotal role in maintaining cell sequence. ATM cells from user A that are destined to user B are first routed from A to the Home PBS for A. The cells are then routed along a predetermined virtual path from the Source Home PBS to the Destination Home PBS, where they are buffered and then delivered in-sequence to B's Local PBS.

Referring to FIG. 8, a virtual path from PBS 2 to 7 (passing through 4 and 6) transports ATM cells from A to B. That is, PBS 2 is the Local PBS for A and also the Source Home PBS for the A to B connection. Likewise, PBS 7 is the Local PBS for B and also the Destination Home for the A to B connection. When A moves to location A' (with a wireless connection to its new Local PBS 3), the ATM cells are first routed along a predetermined path from PBS 3 back to the Home PBS 2, and then along the virtual path from 2 to 7. If B has also moved, for example, to B', then B's Home PBS 7 will forward the ATM cells to B's Local PBS 8, which is its current position, again using a predetermined path.

The advantages of the present Homing Algorithm Routing Scheme include simple control and preservation of the FIFO cell sequence within a VC and between VCs with common endpoints. The implementation allows the preservation of the FIFO cell sequence without a centralized controller and without resequencing at the destination. In the described example, cells obviously preserve their FIFO sequence as they traverse the virtual path from 2 to 7. Thus, the routing scheme need only maintain "local cell sequence" as cells flow to/from the Home PBS as the handoff occurs from one base station to the next.

There is some inefficiency associated with always routing cells to/from Home Stations. Accordingly, to improve network efficiency, the locations of the Home PBSs are "slowly" updated as users move through the network. For example, after A moves to A', PBS 3 can be redefined to be the new Source Home with, for example, a path through PBS 5 to reach the Destination Home PBS 7.

The following addresses procedures for establishing the updating of Source Home Local PBSs and Destination Home and Local PBSs. When a mobile moves from a first Local PBS $S_1$ to a second Local PBS $S_2$, the mobile sends a signaling request (through $S_2$) to its Source Home $S_H$—using the signaling VCI (5). Provided there is bandwidth available to keep the connection established from the new location $S_2$. $S_H$ responds through $S_2$ to the mobile with a new VPI and VCI. In addition, $S_H$ also notifies the mobile of the sequence number of the last ATM cell it received from that connection. This is needed to deal with the problem that ATM cells transmitted while the mobile was at $S_1$ may not have reached $S_H$ yet. Note that this requires $S_H$ to record the sequence numbers of each cell for the active VCs "destined to it" (and therefore is done on the low-speed side of the PBS). If the last sequence number received at $S_H$ is not equal to the last sequence number transmitted by the mobile, then the mobile retransmits the appropriate cells. Meanwhile, $S_H$ deletes the old VPI/VCI entry and any remaining cells transmitted while the mobile was at $S_1$ will be dropped when they reach $S_H$.

If it is desired for this connection to update the Source Home from $S_H$ to the Local PBS $S_2$, a similar procedure is used, except that the signaling request is sent to the destination Home $D_H$, which then responds (if bandwidth is available) with the VPI, VCI and the last-received sequence number.

As an alternative to the above-described updating procedure, Source forwarding and Source-Home updates may be accomplished in another manner. When a mobile moves from Local PBS $S_1$ to Local PBS $S_2$, the mobile sends a signaling request (through $S_2$ and $S_1$) to its Source Home $S_H$. Provided there is bandwidth available to keep the connection established from the new location $S_2$, $S_2$ responds to the mobile with a new VPI and VCI. Cells transmitted from $S_2$ using the new VPI and VCI are delayed (in a small FIFO) at $D_H$ until all cells arrive from $S_H$. A special "Tail" Signal sent from $S_1$ to $S_H$ indicates the old path is clear, and also indicates that the old VPI/VCI entry should be deleted.

If it is desired to update the Source Home (for this connection) from $S_H$ to the Local PBS $S_2$, a similar procedure is used, except that the signaling request is sent from $S_H$ to the Destination Home $D_H$, which then responds (if bandwidth is available) with the new VPI and VCI. Cells transmitted from the new Source Home $S_2$ will be delayed (in a small FIFO) at $D_H$ until all cells have arrived from $S_H$ (the previous Source Home) which is indicated by the arrival of the "Tail" signal.

When a mobile moves from Local PBS $D_1$ to Local PBS $D_2$, (Destination Forwarding) the mobile sends a signaling request (through $D_2$) to its Destination Home $D_H$. Since $D_2$ has knowledge of the network topology and it also controls the assignment of VCIs for connections destined to itself, it includes in the message to $D_H$ the new VPI and VCI. In addition, the mobile informs $D_H$ of the sequence number of the last received cell. If the last sequence number transmitted from $D_H$ doesn't match the last sequence number received by the mobile, then $D_H$ retransmits the appropriate ATM cells to $D_2$—using the new VPI and VCI. Note that this requires the PBS to have a low-rate "Forwarding Queue" that stores the last "N" ATM cells it forwarded for each connection. In addition, there is need for VPI/VCI translation for forwarding cells.

If it is desired for this connection to update the Destination Home from $D_H$ to the Local PBS $D_2$, a similar procedure is used, except that the signaling request is sent to the Source Home $S_H$ which then (if bandwidth is available to allow the update) transmits future cells directly to $D_2$. The mobile then uses a single FIFO buffer to delay (if necessary) the cells transmitted to the new Destination Home PBS ($D_2$) until all cells have arrived from $D_H$.

Note that Home PBSs are associated with connections, and not necessarily with mobiles. For instance the Source Home in FIG. 8 for the connection from A' to B may be different than the Source Home for a connection from A' to C. Typically, all connections originating from a mobile will have the same Source Home and all connections destined to a mobile will have the same Destination Home. However, because Home stations can be updated as mobiles move about the network, various connections may temporarily have different Homes.

Finally, for "forwarding cells", note that VPI/VCI translation is required only at the Source Home $S_H$ (if the source is not located at $S_H$) and the Destination Home (if the destination is not located at $D_H$).

Control and Management

In this section, certain control and management functions are considered, i.e., network management, mobility management, and connection control. Network management algorithms are designed to configure data tables that are used by connection control algorithms. These data tables change due to network upgrades and faults/restorals. Two aspects of mobility management are considered: (i) registrations, to handle mobile sign-ons, and idle handoffs, i.e., handoffs that occur when a mobile unit is powered on, but not in a connection; and (ii) mobile location procedures during connection setup. Finally, connection control procedures are described to set up and release connections on-demand. This includes managing available resources, such as link bandwidth and VCIs. Since the present inventions LAN is targeted for use with multimedia end-units, to ensure guaranteed jitter bounds for voice and video (isochronous) traffic, schemes are adopted where Quality-of-Service (QoS) guarantees are provided during connection admission. For applications that do not require such QoS guarantees, simplified connection control schemes can be applied by omitting the QoS checking phase.

Some of the signaling messages, needed to support the connection control and mobility management procedures, are sent on out-of-band signaling channels, i.e., the standard signaling VCI (VCI 5) on all VPIs. Other messages are exchanged on inband signaling channels (using the same VCI as the user information, with the Payload Type (PT) field distinguishing signaling data from user traffic), or on dedicated VCIs.

Figure 9:
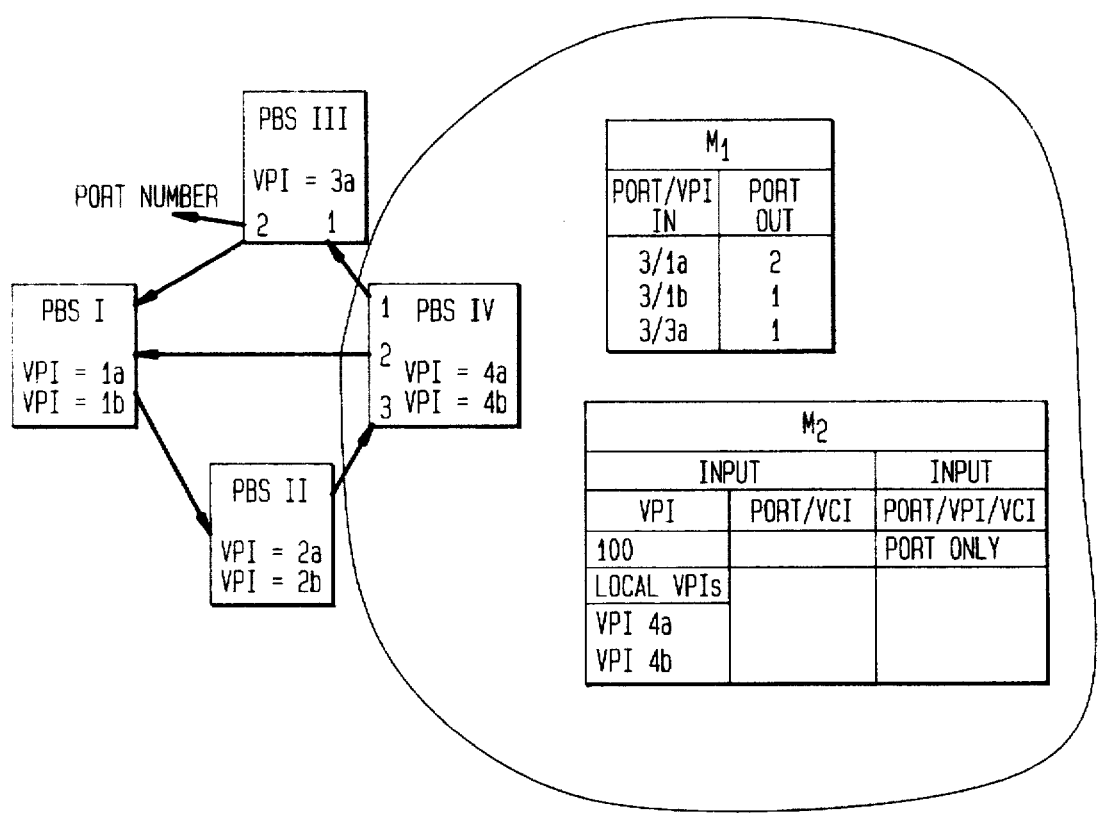
FIG. 9 shows a portion of the network administered tables for use in the present invention PBS network.

In order to administer the per PBS VPI allocations described in FIG. 6 VPI routing tables are needed to be set up in the PBSs as shown in FIG. 9. The VPIs allocated to each PBS are shown in italics within boxes marked with the PBS identifiers (numbers I–IV).

Within the present system, it will be understood that VPI 0 is reserved for mobile-to-mobile communication. Each PBS stores the VPI routing Table $M_1$, which is a mapping of an incoming VPI on any port to an outgoing Port. In FIG. 9, a part of this table is shown for PBS IV. In setting up Table $M_1$, a unique path from any source to any destination PBS is ensured for a given VPI. The algorithms for configuring and maintaining these tables can be executed in a centralized or distributed manner.

In addition, VPI 100 is assigned as a broadcast VPI used by all the PBSs for mobile location prior to connection establishment. Using shortest path algorithms, such as Dijkstra's or Bellman-Ford, a tree is set up from each PBS to all other PBSs. Different VCIs are used to distinguish the trees originating from different PBSs all of which use VPI 100. Table $M_2$, as shown in FIG. 9, is needed to map/translate VCIs only for VPI 100 and other local VPIs. The table entries corresponding to VPI 100 only map input port and VCI to an output port without changing the VCIs. For data received on local VPIs, both VPI and VCI may be translated. To maintain the ad-hoc nature of this network, the number of network management administered tables that are required in each PBS has been minimized while designing control procedures.

Next, procedures are described for two aspects of mobility management: registrations (for power-up, power-down, and idle handoffs) and mobile location. Three options are considered for mobile registration and location. In Option I, each mobile registers on power-up and power-down, as well as when it moves to a new PBS. Each PBS broadcasts its identifying beacon which allows the mobile to determine that it has entered the domain of a new PBS. When a PBS receives a registration message, it broadcasts the mobile's presence to all the other PBSs in the LAN. Thus, if a connection is requested to this mobile, the Local PBS of the calling mobile knows the location of the called mobile immediately. A connection can be set up from itself to the Local PBS of the called mobile.

In Option II, each mobile registers on power-up, power-down, and on changing PBSs, but the PBS, upon receiving a registration message, does not broadcast the presence of the mobile to the other PBSs. Thus, when a connection is requested to a mobile, the Local PBS of the calling mobile does not know the current location of the called mobile or even if it is powered-on. A page is required to find the Local PBS of the called mobile.

In Option III, a mobile does not register at all. In this case, when a connection request is made, the Local PBS of the calling mobile must initiate a page to all the PBSs. Each PBS, in turn, must initiate a page to determine if the called mobile is listening to its beacon.

In a preferred embodiment of the invention, Option II is selected for the PBS LAN. This selection is based on the trade-off between the excessive connection setup time needed in Option III vs. the excessive number of messages needed to track the mobile in Option I. Thus, our mobile location algorithm or method consists of using broadcast pages to locate the Local PBS of the called mobile.

Idle handoffs occur when a powered mobile, that is not part of a connection, moves from one PBS to the next. Registration messages are sent by a mobile whenever it identifies a new PBS. The beacon transmitted by the PBS includes as a parameter one of its assigned VPIs, thus enabling the mobile to recognize the presence of a new PBS. Assuming that the strength of the signal from the mobile to the old PBS may be weak, instead of requiring the mobile to de-register with the old PBS, the new PBS sends a De-registration message to the old PBS.

The procedure for mobile location prior to connection establishment is now described. As can be understood, the process of requiring a mobile to register upon powering-up allows the PBS-based network to set up incoming connections to the mobile. Upon receiving an incoming message from a mobile, the Local PBS simply makes a record of the mobile. It does not register the mobile's presence in any location database, as is done in current cellular networks, nor does it broadcast the presence of the mobile to the other PBSs. Thus, when a connection is requested to a mobile, the Local PBS of the calling mobile does not know the current location of the called mobile or even if it is powered-on. A broadcast page is generated by the Local PBS of the calling mobile to find the Local PBS of the called mobile. If the called mobile is registered on one of the PBSs in the network, this PBS responds to the broadcast page and connection establishment between the two Local PBSs of the calling and called users proceeds. If the mobile is not registered at any of the PBSs in the network, the Local PBS of the calling mobile that generated the broadcast page times-out and rejects the call request.

We do not employ any location servers or registers in order to keep the network simple. As we are primarily focused on a LAN, when a mobile generates a request for connections to another mobile, the Local PBS of the calling mobile merely performs a broadcast to determine the PBS at which the called mobile is registered. The called mobile's Local PBS responds, allowing for the connection setup between the two PBSs to proceed. For mobile-to-fixed-endpoint (server or user) connections, a PBS may store the identity of the PBS to which the fixed endpoint is connected or may determine the location each time by the broadcast-search process.

Connection control is now described, wherein it is shown how connections are set up in this LAN while supporting the new Wireless ATM VP/VC concept. All the scenarios discussed are for two-party connections. Extensions of these procedures for multi-party connections and third-party connection control may also be derived.

The steps involved in setting up on-demand connections in any ATM network consist of:

1. Finding a route between the endpoints of the connection,
2. Checking the availability of bandwidth and other QoS measures, if any,
3. Selecting VCIs at each link on the end-to-end connection, and
4. Setting up VP/VC and port-translation tables.

In the present invention LAN, step 1 is not required for each on-demand connection. By using destination-based VPI addressing, the routes are predetermined by the mapping tables $M_1$ at each PBS as previously described. In step 2, the availability of bandwidth and other QoS measures are checked at each transit PBS on the route between the Local PBSs of the calling and called mobiles. The selection of VCIs in step 3, and the setting up of translations in step 4 (mapping table $M_2$), need to be performed only at the two Local PBSs. Before performing steps 2,3, and 4 to establish a connection, a procedure is needed to locate the called mobile since this ATM LAN is primarily used to interconnect mobiles.

Figure 10:
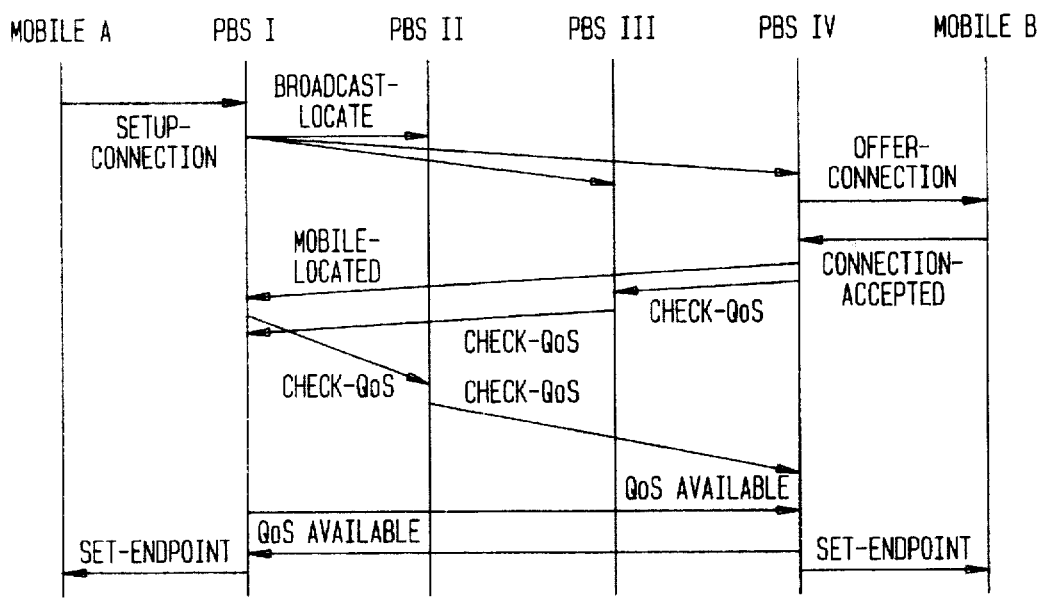
FIG. 10 shows a connection establishment procedure for the present invention wireless ATM LAN.
Figure 11:
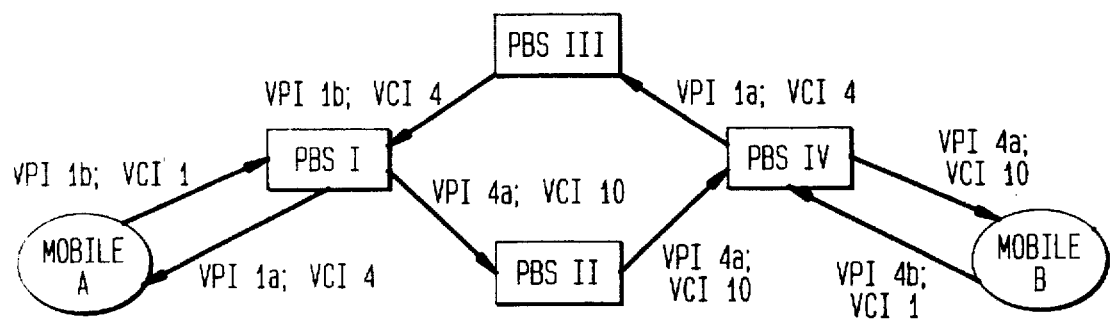
FIG. 11 shows an exemplary LAN configuration and assignment for the connection establishment of FIG. 12.

The procedure for locating the called mobile, selecting VCIs, checking the availability of the requested QoS, and setting up translations is explained by example. Referring to FIG. 10, a bi-directional connection setup initiated by mobile A to mobile B is illustrated. As can be seen, mobile A generates a Setup-connection message with parameters identifying the two mobiles and QoS measures, if any. The Local PBS of mobile A, which is PBS I in FIG. 10, generates a broadcast message, on VPI 100 and its assigned VCI, in order to locate the called mobile's Local PBS. In this message, besides the called mobile's address, it assigns one of its VPIs (VPI 1a) with a VCI (VCI 4) for the backward connection, i.e. from the called mobile's Local PBS to itself, as shown in FIG. 11. Assuming the called mobile B is located on PBS IV, this PBS offers the connection to mobile B. This step is needed to alert the called mobile before actually setting up the connection. If this is accepted, PBS IV responds to PBS I with a Mobile-located message in which it assigns a VPI (VPI 4a) and VCI (VCI 10) for the forward connection from PBS I to PBS IV. FIG. 11 shows that the selected VPIs for the two directions of the connection may follow different routes, i.e. pass through different intermediate PBSs. The destination PBS for each connection is assumed to manage the VCIs incoming on its VPIs. If the called mobile (mobile B) rejects the connection offer, a Connection-rejected message is sent from PBS IV to PBS I, and subsequently to the calling mobile (mobile A).

Referring to FIG. 11 in connection with FIG. 10, it can be seen that next, both PBS I and PBS IV send the Check-QoS message in opposite directions to check for the availability of the QoS measures requested on the routes followed by VPI 4a and VPI 1a, respectively. The Check-QoS messages are sent in a hop-by-hop manner through all the PBSs in the path between the two Local PBSs for the assigned VPIs. Unlike B-ISDN signaling standards for ATM switches, inband signaling is used in this LAN to carry this Check-QoS message. Upon receiving this message, each transit PBS, such as PBS III, determines if the requested QoS measures are available. For example, if average bandwidth is one of the QoS measures specified, PBS III would check for the availability of the requested bandwidth on its outgoing port for the VPI being traced. If the requested QoS measures are available, the transit PBS passes on the in-band signaling message Check-QoS to the next PBS on the route for the VPI on which the message arrived, after reserving the required QoS measures for the given connection. The two PBSs (PBS I and PBS IV) exchange QoS-available messages upon the successful reception of the Check-QoS messages. Although the QoS parameters supported in this network have not been explicitly stated, depending on the implementation, these could include peak and average bandwidth, delay, jitter, etc.

In-band signaling implies using the VPI and VCI of the assigned connection with the payload type (PT) field indicating a signaling cell. For example, the Check-QoS message from PBS IV to PBS I is sent on VPI 1a, VCI 4 with the PT field set to indicate signaling. Parameters of this message are defined such that the whole message does not require more than one ATM cell. This eliminates the need for a signaling AAL and speeds up the processing of this message at each transit PBS. Using the VPI/VCI of the assigned connection, with the payload-type in the ATM cell header set to indicate signaling, the message is passed through the set of transit switches on the assigned VPI. Each PBS checks for availability of the specified QoS measures, and passes the message to the next PBS on the VP tree. By using in-band signaling, we reduce protocol layer processing at each transit PBS. It also implies that additional data tables are not required at the PBSs for routing signaling messages. For example, if the Check-QoS message is sent out-of-band, then the message from one transit node to the next needs to be sent on the signaling VCI of a VPI assigned to the receiving transit PBS. This PBS then needs to consult a data table to determine a VPI for the next transit PBS that is on the route of the VPI for the connection being traced. Thus, with a hybrid out-of-band and in-band signaling scheme, connection control and mobility management procedures can be supported with minimal data tables.

Figure 12:
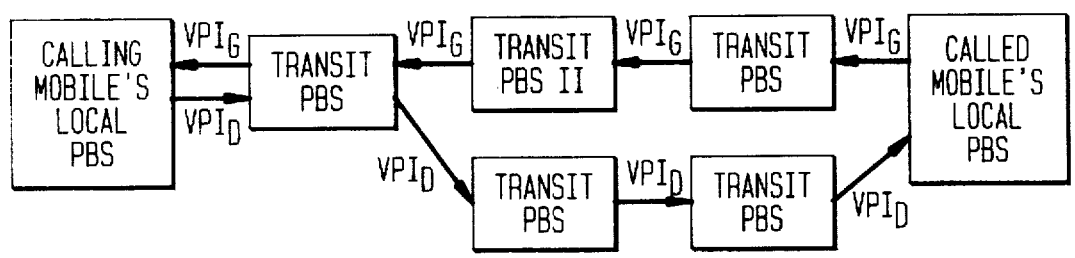
FIG. 12 shows an exemplary routing configuration through the present invention LAN.

As in FIG. 11, it is likely that in our LAN the set of transit switches in the two directions may be different because VPI trees may not be pre-configured with symmetric routes. Another example of this case is shown in FIG. 12. This implies that QoS checking must be done separately in the two directions. In the present invention LAN, we have the advantage that the two Local PBSs are determined before connection establishment. For connection requests to mobiles, this determination is made by both Local PBSs during the broadcast-location phase. For connection requests to fixed endpoints, the calling party's Local PBS may determine the far-end Local PBS simply from the called party's address. It then communicates its own identity and the need for a connection establishment to the far-end Local PBS. This feature allows the QoS checking process to proceed in both directions simultaneously.

At this point, still referring to FIGS. 10 and 11, the two Local PBSs send the Set-endpoint messages communicating the VPI/VCI pair for the forward and backward connections to the two end-mobiles. Each Local PBS reuses the VPI/VCI incoming to itself from the far-end Local PBS on the air interface link. But, for the opposite direction, it assigns a VPI/VCI corresponding to one of its own VPIs. For example, PBS I reuses VPI 1a, VCI 4 for its downward link to the mobile, but picks a VPI/VCI (VPI 1b, VCI 1) terminating on itself for the upward link.

If a PBS in transit finds that it cannot allocate the requested QoS, it sends a QoS-unavailable message on the signaling channel (VCI 5) of the VPI being traced. This message directly reaches the end PBS without any processing in the intermediate nodes. In this case, this PBS (being one of the two Local PBS 6) sends a QoS-unavailable message to the other Local PBS. The connection is rejected to the requesting mobile by its Local PBS and the VCIs and any reserved QoS measures are released.

In order to speed-up the end-to-end connection setup process, each transit PBS can send the Check-QoS forward to the next PBS while it performs its own processing. To support this, separate positive (and negative) messages need to be generated by each transit PBS to the end Local PBS to confirm QoS availability. The increased messaging needs to be traded-off against the gain in end-to-end connection setup delay for specific network designs.

Figure 13:
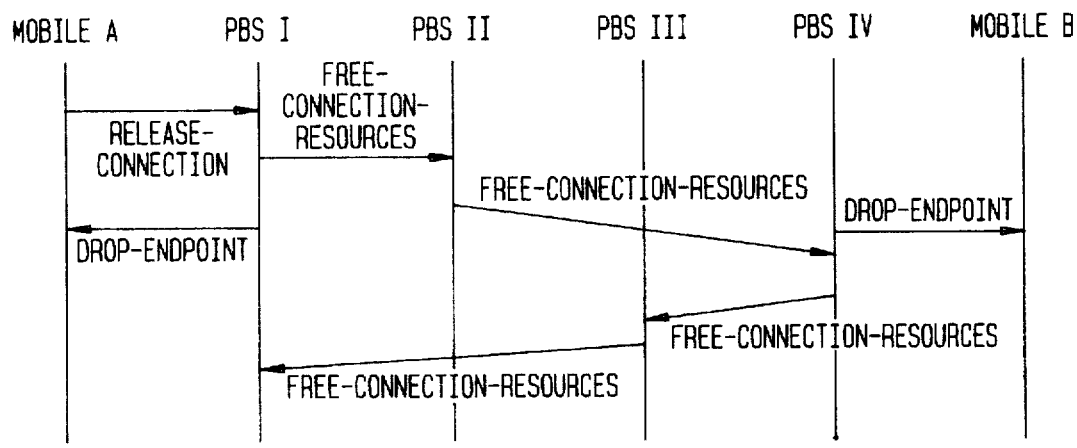
FIG. 13 shows a connection release procedure for the wireless ATM LAN.

The procedure used to release connections is shown in FIG. 13. It can be initiated by either of the mobiles A or B in the connection with a Release-connection message. The Local PBS of the release-initiating mobile sends a Free-connection-resources message. It also sends a Drop-endpoint message back to the mobile. The far-end PBS (PBS IV) sends a Drop-endpoint message to its mobile and generates a Free-connection-resources message to the first transit PBS in the route along the backward connection. The transit PBSs (PBS II and PBS III) release the resources that they had reserved on the two routes (VPI 1a and VPI 4a). These messages are routed inband on the VP in VCIs being released.

An alternative method to set up fast connections with QoS guarantees is described in the following paragraphs. Each PBS stores the routes from any source PBS to itself for each of its designated VPIs. Link and node resources are pre-divided among all the PBSs. Thus, a PBS while assigning VCIs for incoming on-demand connections, checks resource availability on all the links and nodes in the route from the source PBS to itself for the given VPI selected. Connection setup time is lower using this approach when compared to the approach presented earlier, since the hop-by-hop Check-QoS procedure is no longer needed. For example, in FIG. 11, resource availability on all the links and nodes constituting the route from PBS I to PBS IV is checked at PBS IV and on the route from PBS IV to PBS I at PBS I. Drawbacks of this approach include a reduction in network scalability and a reduction in statistical multiplexing gains. Hybrid schemes combining the two approaches can also be considered for large networks.

To support the approach described earlier with respect to FIG. 11, a simple data table $M_3$ is needed at each PBS to track its own resources, such as bandwidth on its ports. For each on-demand connection that is established across a PBS, the PBS determines if it has sufficient resources to meet the QoS requirements of the connection. To support the alternative approach presented here, we need two mapping tables in each PBS X, these tables are:

$M_3$: Destination VPI+Source PBS ID-->a route of PBSs; for all VPIs assigned to the PBS X and where the route is specified using a sequence of PBS IDs and port numbers on the PBSs; and $M_4$: link/node-->allocated resource; for all links and nodes in the network.

Maintaining these additional tables, however, is difficult in an ad-hoc network. Thus, it may necessitate the need for a system administrator while upgrading the network, i.e., when a PBS is added or removed.

Figure 14:
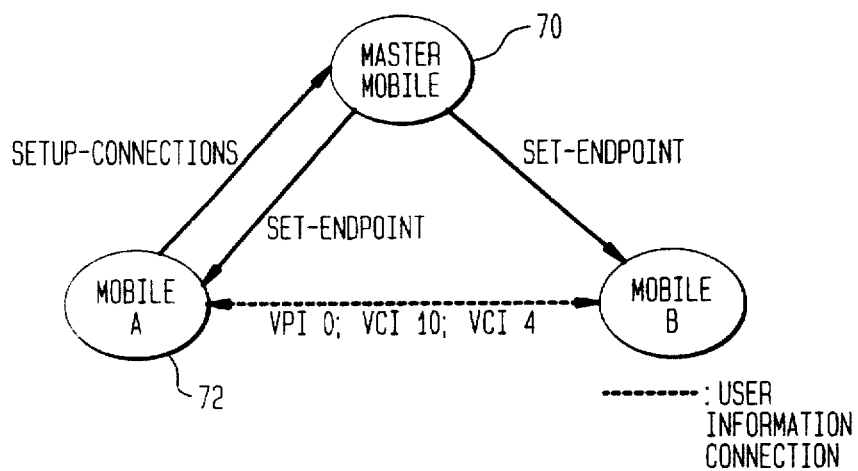
FIG. 14 illustrates a mobile to mobile connection without PBS involvement.

As described previously, the present invention PBS network allows mobiles outside the range of the PBS network to communicate directly with each other. When a mobile powers-on, it checks to see if it can pick up a transmitting beacon of some other mobile or a PBS. If no such mobile or PBS exists, it starts transmitting its own beacon, and thus becomes a master 70 as shown in FIG. 14. When a second mobile 72 listens to this beacon, it can request connections to other mobiles as shown in FIG. 14. The master mobile 70 allocates VCIs for the two channels in a bi-directional connection using Set-endpoint messages. It is assumed that VPI 0 is used for mobile-to-mobile connections, as described earlier. Such connections are handled in small disjoint mobile-controlled groups outside the scope of the PBS network.

Figure 15:
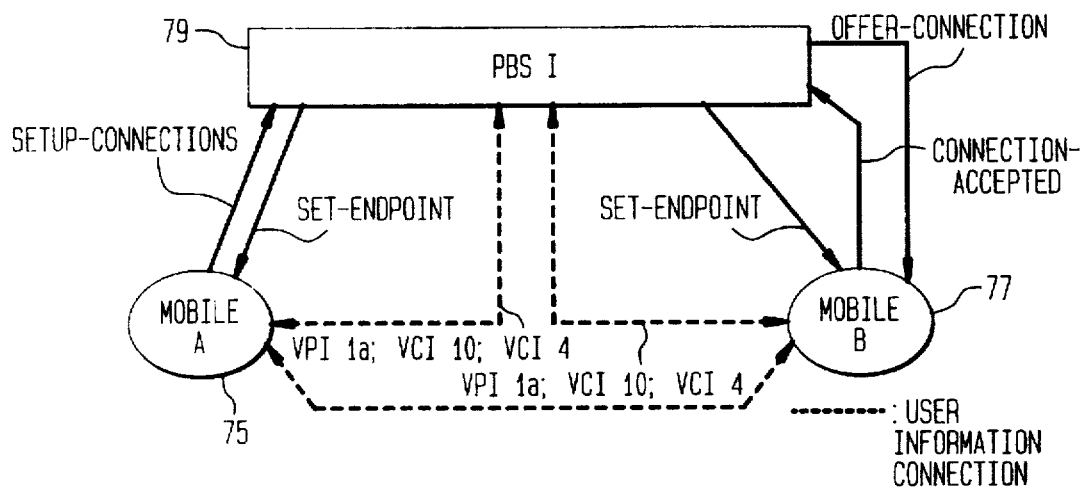
FIG. 15 illustrates connection establishment between mobiles on the same PBS.

A distinction needs to be drawn between the case discussed above and one in which a PBS is present with both mobiles on the connection being located on the same PBS. In the latter case, the procedure discussed using FIG. 10 applies. In FIG. 15, there is shown a mobile 75 (mobile A) originating a call to another mobile 77 (mobile B) that is also in the domain of the same PBS 79. The message exchange consists of Setup-connection, Offer-connection, Connection-accepted, and Set-endpoint, for connection establishment, and Release-connection, and Drop-endpoint, for connection release. The cross-PBS mobile location and QoS checking procedures are not required in this scenario. The user information connection may be routed through the PBS or directly between the two mobiles, as shown in FIG. 15, depending on whether or not, the two mobiles are within listening distance of each other. In FIG. 15, the bi-directional user connection is within the control of PBS I, and hence uses one of its VPIs, VPI 1a.

Figure 16:
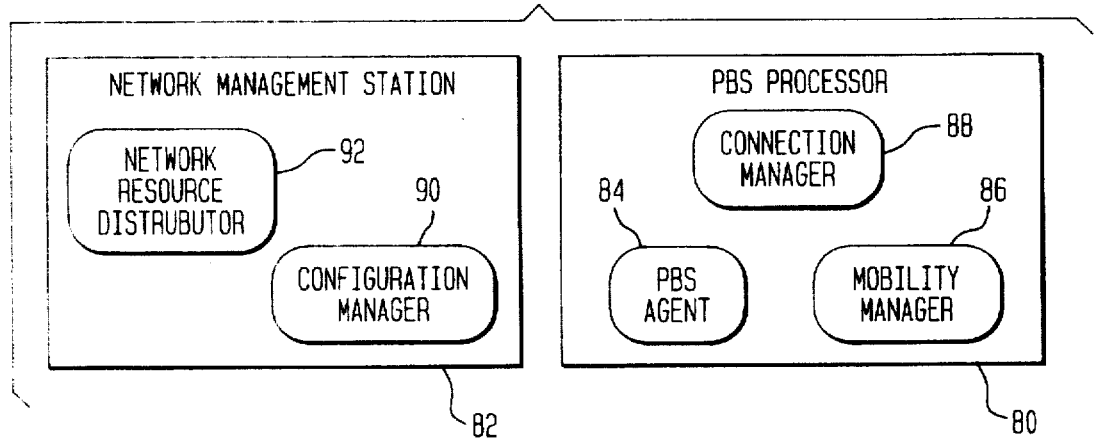
FIG. 16 shows a software architecture for PBS and network management station.

The layout of the networking software needed for control and management in the PBSs and network management stations is shown in FIG. 16. Each block shown within the PBS processor 80 and network management station 82 in FIG. 16 represents a software functional entity. Each entity can be implemented as a single process or a collection of processes. The PBS Agent 84 in each PBS tracks free and allocated VCIs on all the VPIs assigned to the PBS. In addition, it also manages resources, such as link bandwidth, for the PBS. The Mobility Manager 86 processes registrations, generates/responds to broadcast location messages, and manages handoffs. The Connection Manager 88 is needed only in the alternative connection establishment approach described above. It checks resource availability on the route taken from a source PBS to a given destination on any of its VPIs during on-demand connection establishment for connections that require QoS guarantees.

The software entities on each network management station 82 include a Configuration Manager 90 and a Network Resource Distributor 92. The configuration manager 90 sets up the mapping tables, $M_1$, and part of $M_2$, (for VPI 100), as defined with respect to FIG. 9, and handles the addition and deletion of PBSs, allowing the LAN to grow in an ad-hoc manner. The configuration manager 90 may also be implemented in a distributed manner at each PBS, depending on the processing and memory capabilities available in the PBSs. In this case, a network may be constructed with only PBS elements, i.e., without any network management stations. The network resource distributor 92 pre-assigns resources of each node and link in the network to all PBSs, i.e., sets-up tables $M_3$ and $M_4$ described in the alternative connection establishment procedure. The exact number of network management stations needed is dependent on the traffic and configuration of the PBS LAN. Distributed algorithms for these functions may be implemented across multiple network management stations that are connected to one or more PBSs. This modularized software architecture allows a network to be constructed using only the PBS agent, mobility manager and configuration manager modules. Such a network would only support the connection establishment procedure described in FIG. 13. To offer connection services with improved setup delays, the network resource distributor and connection manager modules are needed. These can be added at an additional cost.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A communications network for transfer of Asynchronous Transfer Mode (ATM) cells between mobile users, said network comprising:

a plurality of relocatable switching nodes, said switching nodes being coupled to one another via a high speed backbone link; and one or more wireless access links included in each of said switching nodes adapted to couple to said mobile users, wherein a first mobile user transmitting data to a second mobile user in said network is associated with a source home node and said second mobile user receiving data is associated with a destination home node, and wherein said ATM cells in a connection between said first mobile user and said second mobile user are substantially always routed along a path from said first mobile user including said source home node and along a path from said source home node to said destination home node and then along a path including said destination home node to said second mobile user, wherein in-sequence delivery of said ATM cells between said first and second mobile user is enabled to be maintained, further including a source local node and a destination local node selected from said plurality of switching nodes, said source local node associated with a present position of said first mobile user, and said destination local node associated with a present position of said second mobile user, wherein said ATM cells transmitted from said first mobile user are initially received at said source local node and said ATM cells received at said second mobile user are ultimately transmitted from said destination local node, wherein said source local node and said destination local node are updatable as a mobile user moves throughout said network.

2. The network of claim 1, wherein said first mobile user, said source local node and said source home node may be different nodes in said network.

3. The network of claim 1, wherein said second mobile user, said destination local node and said destination home node may be different nodes in said network.

4. The network of claim 1, wherein said high speed backbone link of said switching nodes is configurable in an arbitrary ad-hoc topology.

5. The network of claim 1, wherein said source home node and said destination home node associated with said first and second mobile user, respectively, are updatable as said first and second mobile users move throughout said network.

6. The network of claim 1, wherein a VPI (virtual path identifier) for routing said ATM cells within said network corresponds only to a destination node, thereby eliminating a need for translation at intermediate nodes along a route.

7. The network of claim 1, wherein for transmission of a message, said first mobile user requires only an address of said source home node associated with said first mobile user and said second mobile user requires only an address of said destination home node associated with said second mobile user.

8. The network of claim 1, wherein during transmission of a message a source home node only requires an address of a destination home node and not a mobile user destination address.

9. The network of claim 1, wherein said high speed backbone link is adapted for wireless transmission of said ATM cells between said plurality of switching nodes.

10. The network of claim 1, wherein said path between said source home node and said destination home node is fixed during a connection.

11. A communications network for transfer of Asynchronous Transfer Mode (ATM) cells between mobile users, said network comprising:

a plurality of relocatable switching nodes, said switching nodes being coupled to one another via a high speed backbone link; and one or more wireless access links included in each of said switching nodes adapted to couple to said mobile users, wherein a first mobile user transmitting data to a second mobile user in said network is associated with a source home node and said second mobile user receiving data is associated with a destination home node, and wherein said ATM cells in a connection between said first mobile user and said second mobile user are substantially always routed along a path from said first mobile user including said source home node and along a path from said source home node to said destination home node and then along a path including said destination home node to said second mobile user, wherein in-sequence delivery of said ATM cells between said first and second mobile user is enabled to be maintained, further including a source local node and a destination local node selected from said plurality of switching nodes, said source local node associated with a present position of said first mobile user, and said destination local node associated with a present position of said second mobile user, wherein said ATM cells transmitted from said first mobile user are initially received at said source local node and said ATM cells received at said second mobile user are ultimately transmitted from said destination local node, wherein said first mobile user may move from a first location to a second location during a connection thereby associating itself with a new source local node, and wherein cell sequence is preserved in said connection by issuance of a "Tail" signal from said source local node associated with said first location.

12. The network of claim 11, wherein said source home node is operable to wait for said Tail signal before serving cells from said second location of said first mobile user.

13. The network of claim 12, wherein said switching nodes include FIFO memory means, and wherein said cells transmitted from said new local node are delayed at said source home node in said FIFO memory until said tail signal is received.

14. A communications network for transfer of Asynchronous Transfer Mode (ATM) cells between mobile users said network comprising:

a plurality of relocatable switching nodes, said switching nodes being coupled to one another via a high speed backbone link; and one or more wireless access links included in each of said switching nodes adapted to couple to said mobile users, wherein a first mobile user transmitting data to a second mobile user in said network is associated with a source home node and said second mobile user receiving data is associated with a destination home node, and wherein said ATM cells in a connection between said first mobile user and said second mobile user are substantially always routed along a path from said first mobile user including said source home node and along a path from said source home node to said destination home node and then along a path including said destination home node to said second mobile user, wherein in-sequence delivery of said ATM cells between said first and second mobile user is enabled to be maintained, further including a source local node and a destination local node selected from said plurality of switching nodes, said source local node associated with a present position of said first mobile user, and said destination local node associated with a present position of said second mobile user, wherein said ATM cells transmitted from said first mobile user are initially received at said source local node and said ATM cells received at said second mobile user are ultimately transmitted from said destination local node, wherein said first mobile user may move from a first location to a second location during a connection thereby associating itself with a new source local node, and wherein said source home node associated with said first mobile is operable to record sequence numbers of cells for its own active virtual channels (VCs), wherein said source home node notifies said first mobile user of the last sequence number of a cell received through said new source local node, and wherein said mobile retransmits appropriate cells if the last sequence number differs from said last sequence number received at said source home node.

15. A communications network for transfer of Asynchronous Transfer Mode (ATM) cells between mobile users, said network comprising:

a plurality of relocatable switching nodes, said switching nodes being coupled to one another via a high speed backbone link; and one or more wireless access links included in each of said switching nodes adapted to couple to said mobile users, wherein a first mobile user transmitting data to a second mobile user in said network is associated with a source home node and said second mobile user receiving data is associated with a destination home node, and wherein said ATM cells in a connection between said first mobile user and said second mobile user are substantially always routed along a path from said first mobile user including said source home node and along a path from said source home node to said destination home node and then along a path including said destination home node to said second mobile user, wherein in-sequence delivery of said ATM cells between said first and second mobile user is enabled to be maintained.

further including a source local node and a destination local node selected from said plurality of switching nodes, said source local node associated with a present position of said first mobile user, and said destination local node associated with a present position of said second mobile user, wherein said ATM cells transmitted from said first mobile user are initially received at said source local node and said ATM cells received at said second mobile user are ultimately transmitted from said destination local node.

wherein said second mobile user is operable to update said local destination node by sending a signaling request including a sequence number of a last received cell through the new local node to said destination home node, and said destination home node is operable to retransmit appropriate ATM cells to said new local node if the last sequence number transmitted from said destination home node does not match said sequence number of said last received cell at said second mobile user.

16. A method for routing ATM cells in a network of mobile users which includes a plurality of high speed switching nodes adapted to be coupled to one another, said method comprising the steps of:

establishing a source home node for a source mobile user and a destination home node for a destination mobile user for use in a connection between said source user and said destination user; and routing said ATM cells along a path from said source mobile user including said source home node, and along a path from said source home node to said destination home node, and then along a path including said destination home node to said destination user, further including the step of establishing a local node associated with a present position of a mobile user, wherein data transferred to and from said mobile user travels through said local node, wherein said local node and said source home node for a mobile user may be different nodes in said network and said local node and said destination home node for a mobile user may be different nodes in said network.

further including the step of updating said local node to be said source home node and updating said local node for said mobile user to be said destination home node.

17. The method of claim 16, wherein said plurality of high speed switching nodes are adapted for wireless coupling between one another.

18. The method of claim 16, wherein said plurality switching nodes couple to one another to form a high speed backbone link configurable in arbitrary ad-hoc topology.

19. A method for routing ATM cells in a network of mobile users which includes a plurality of high speed switching nodes adapted to be coupled to one another, said method comprising the steps of:

establishing a source home node for a source mobile user and a destination home node for a destination mobile user for use in a connection between said source user and said destination user; and routing said ATM cells along a path from said source mobile user including said source home node, and along a path from said source home node to said destination home node, and then along a path including said destination home node to said destination user.

further including the step of establishing a local node associated with a present position of a mobile user, wherein data transferred to and from said mobile user travels through said local node.

wherein a mobile user may move from a first location to a second location during a connection thereby associating itself with a new local node, and wherein a procedure for updating a source local node includes the step of issuing a "Tail" signal from a local node associated with said first location through the old local node, and waiting at said source home node for said Tail signal before serving cells from said second location of said mobile.

20. The method of claim 19, further including the steps of:

generating from said mobile user a handoff request to said new local node;

forwarding said handoff request to said source home node through said old local node;

setting up a connection between said new local node and said source home node; and notifying said mobile user from said new local node of a new VPI and VCI.

21. A method for routing ATM cells in a network of mobile users which includes a plurality of high speed switching nodes adapted to be coupled to one another, said method comprising the steps of:

establishing a source home node for a source mobile user and a destination home node for a destination mobile user for use in a connection between said source user and said destination user; and routing said ATM cells along a path from said source mobile user including said source home node, and along a path from said source home node to said destination home node, and then along a path including said destination home node to said destination user.

further including the step of establishing a local node associated with a present position of a mobile user, wherein data transferred to and from said mobile user travels through said local node.

wherein a mobile user may move from a first location to a second location during a connection thereby associating itself with a new local node, and wherein a procedure for updating a source local node includes the steps of:

generating from said mobile user a handoff request to said new local node;

forwarding said handoff request to said source home node through said old local node;

setting up a connection between said new local node and said source home node;

notifying said mobile user from said new local node of a new VPI and VCI and a sequence number of a last received one of said ATM cells; and retransmitting from said destination home node appropriate ones of said ATM cells if said sequence number is not equal to the sequence number of its last transmitted cell.

22. A method for routing ATM cells in a network of mobile users which includes a plurality of high speed switching nodes adapted to be coupled to one another, said method comprising the steps of:

establishing a source home node for a source mobile user and a destination home node for a destination mobile user for use in a connection between said source user and said destination user; and routing said ATM cells along a path from said source mobile user including said source home node, and along a path from said source home node to said destination home node, and then along a path including said destination home node to said destination user, further including the step of establishing a local node associated with a present position of a mobile user, wherein data transferred to and from said mobile user travels through said local node, wherein a mobile user may move from a first location to a second location during a connection thereby associating itself with a new local node, wherein the old local node was the same node as said source home node, a procedure for updating a source local node and preserving a sequence of said ATM cells including the steps of:

generating from said mobile user a handoff request to said new local node;

forwarding said handoff request to said source home node;

setting up a connection between said new local node and said source home node;

notifying said mobile user from said new local node of a new VPI and VCI.

23. A method for routing ATM cells in a network of mobile users which includes a plurality of high speed switching nodes adapted to be coupled to one another, said method comprising the steps of:

establishing a source home node for a source mobile user and a destination home node for a destination mobile user for use in a connection between said source user and said destination user; and routing said ATM cells along a path from said source mobile user including said source home node, and along a path from said source home node to said destination home node, and then along a path including said destination home node to said destination user, further including the step of establishing a local node associated with a present position of a mobile user, wherein data transferred to and from said mobile user travels through said local node, wherein a mobile user may move from a first location to a second location during a connection thereby associating itself with a new local node, and wherein a procedure for updating a destination local node includes the steps of:

generating from said mobile user a handoff request to said new local node with a sequence number included of a last one of said ATM cells received;

forwarding said handoff request to said destination home node through the old local node;

setting up a connection between said new local node and said source home node;

notifying said mobile user from said new local node of a new VPI and VCI; and retransmitting form said mobile user appropriate ones of said ATM cells if said sequence number is not equal to the sequence number of its last transmitted cell.

* * * * *